US005910696A

United States Patent [19]

Kang

[11] Patent Number: 5,910,696

[45] Date of Patent: Jun. 8, 1999

[54] REDUCED NOISE COMMUTATOR SYSTEM

[75] Inventor: Hongling Kang, Livonia, Mich.

[73] Assignee: UT Automotive Dearborn, Inc., Dearborn, Mich.

[21] Appl. No.: 08/980,678

[22] Filed: Dec. 1, 1997

[51] Int. Cl.[6] .......... H02K 13/00

[52] U.S. Cl. .......... 310/236; 310/233; 310/245; 310/242

[58] Field of Search .......... 310/248, 251, 310/252, 233, 245, 51, 236, 239, 242, 241, 237

[56] References Cited

U.S. PATENT DOCUMENTS 5,049,772 9/1991 Mottier et al. .......... 310/233

FOREIGN PATENT DOCUMENTS 57-000047 1/1982 Japan .......... 310/248

04-344149 11/1992 Japan .......... 310/238

*Primary Examiner*—Nestor Ramirez

*Assistant Examiner*—Tran N Nguyen

*Attorney, Agent, or Firm*—Howard & Howard

[57] ABSTRACT

A commutator system comprising a commutator and a commutator brush. The commutator has electrically conducting surfaces that are electrically separated from each other by non-conducting segments. The edges of the conducting surfaces adjacent to the non-conducting segments are oriented at an angle to the rotational axis of commutator. The commutator brush has edges oriented at substantially the same angle.

14 Claims, 1 Drawing Sheet

REDUCED NOISE COMMUTATOR SYSTEM

FIELD OF THE INVENTION

This invention relates to electric motors and generators, generally, and more particularly to a reduced noise commutator system.

BACKGROUND OF THE INVENTION

Commutating motors and generators are known in industry. Typically, a commutator is attached to an armature of the motor. Commutators comprise a circular array of electrically conducting segments, or commutator bars, that are spaced and electrically insulated from each other. The armature contains numerous windings in a predetermined pattern, each winding being connected to a commutator bar. In a motor, electric current is transferred to the windings by brushes, attached to a current source, that make contact to the commutator bars. As the armature rotates, the brushes contact different bars and conduct current to different windings. The electric field generated thereby interacts with electromagnets located around the armature and produces an electromotive force which enables the motor to rotate. Conversely, in a generator, the armature is rotated by an external source and current produced is conducted to an external load by the brushes as the armature and commutator rotate.

A drawback of commutating motors and generators is brush noise. The noise may be aesthetically unpleasant, and, in an industrial setting, may contribute to a hazardous noisy environment. A primary cause of brush noise is the impact of the brush with the commutator bars as they rotate into contact with the brush. Brushes are positively biased toward the commutator to ensure electrical contact, resulting in impact as the brush transitions from the space between the commutator bars to the bars and also as the brush moves over surface variations in the bar itself. The brush impact with the commutator bar and surface variations may also cause the brush to "bounce" off the surface of the commutator and break the electrical contact between the brush and commutator. This not only decreases performance, but may also cause arcing—the discharge of electricity across the gap between the brush and commutator—which is an additional noise source.

Several methods are known to reduce brush noise. One approach has been to control bar to bar variations so that the surfaces of the commutator bars are positioned at a more uniform radius from the axis of rotation. Although reducing noise created by bar to bar variations, the commutator is more expensive and difficult to manufacture. Some commutators have uniform surfaces where the commutator bars are separated by non-conductive material rather than empty spaces so that there is no distinct edge for the brush to impact. This initially reduces noise, but during service, the materials wear at different rates, forming edges on the commutator bars and ultimately producing noise.

Other known approaches to reduce brush noise attempt to control the motion of the brush as it contacts the commutator. For example, one device restricts movement of the brush relative to its brush holder, reducing vibration. Another device utilizes an elastic damping sleeve to dampen the noise produced. These devices are substantially more complicated and more costly to manufacture and assemble than a conventional brush system. Still another brush design allows the brush to pivot on the surface of the commutator. This arrangement, however, allows parts of the brush to repeatedly engage and disengage the commutator, leading to unwanted arcing and performance reduction.

Moreover, various other commutator designs are known. Some of these approaches vary the width of the commutator bars, i.e., vary the times between successive impacts, reducing the fundamental frequency sound resulting from repeated impact of the brush and commutator. However, these designs merely change the character of the noise by broadening the frequency spectrum and do not reduce other sources of noise. Yet another design varies the shape of the edge of the commutator bars so that different parts of the bar impact the brush at different times. This reduces noise by spreading out the impact over time, but results in a loss of motor performance due to inefficient and varying contact between the brush and commutator during rotation.

SUMMARY OF THE INVENTION

It is an advantage of the present invention to overcome the prior art.

It is a further advantage of the present invention to provide a commutator system that broadly reduces brush noise in commutating motors and generators.

Still a further advantage of the present invention is to provide a reduced noise commutator system that does not impair the performance of the motor or generator.

Another advantage of the present invention is to maintain noise reduction benefits over the life of the commutator system.

Yet still a further advantage is to provide a reduced noise commutator system that is neither substantially more complex nor more costly to produce than a conventional commutator system.

The present invention is a commutator system as may be used in electric motors and generators. The invention comprises a commutator and a commutator brush. The commutator has electrically conducting surfaces that are electrically separated from each other by non-conducting segments. The edges of the conducting surfaces adjacent to the non-conducting segments are oriented at an angle to the rotational axis of commutator. The commutator brush has edges oriented at substantially the same angle so as to be generally parallel to the edges of the commutator conducting surfaces. The commutator impacts the brush at an angle during its rotation, reducing noise and associated arcing without diminishing electromechanical performance.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

DESCRIPTION OF THE PREFERRED EMBODIMENTS

Figure 1:
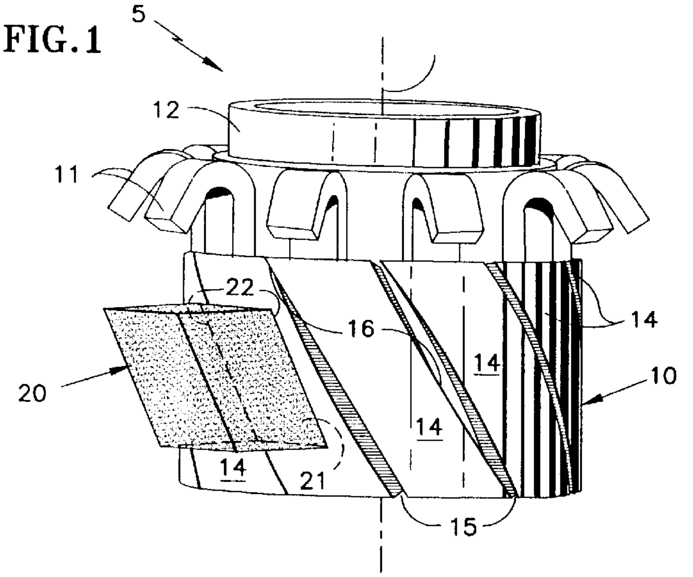
FIG. 1 illustrates a perspective view of a commutator system according to the present invention.

Referring to FIG. 1, a perspective view of a commutator system 5 according to the present invention is shown.

Commutator system 5 comprises a commutator 10 and a brush 20. Commutator 10 has a body 12 that rotates about an axis 13. Body 12 has a plurality of electrically conducting surfaces 14, or commutator bars, formed around the circumference of commutator 10. Each surfaces 14 of the plurality are separated physically and electrically by non-conducting segments or gaps 15.

In the embodiment shown, gaps 15 each comprise an empty space. However, it should be apparent to one of ordinary skill in the art that each gap 15 in the alternate may comprise a non-conductive material between commutator bars 14.

Each commutator bar 14 also comprises edges 16 formed adjacent to gaps 15. These edges 16, and their correspondingly gaps 15, are oriented at an angle to rotation axis 13. Brush 20, moreover, comprises a conductive contact surface 21 having edges 22 which are parallel to the edges 16 of the commutator bars 14 such that edges 22 and edges 16 are both oriented at the same angle to rotation axis 13 as commutator bar edges 16.

Operationally, as commutator 10 rotates, bars 14 come into contact with surface 21 with a pair of brushes, one of which is brush 20. In a motor, these pair of brushes are coupled with a power source, either direct current ("DC") or alternating current ("AC"), such that one brush is coupled with the negative terminal, while the second brush is coupled with the positive terminal. Current is conducted from contact surface 21 to commutator bar 14. Current then flows to attached windings (not shown). In the present embodiment, current thereafter flows through a commutator hook 11 connected to commutator 10. Current flowing through the windings interacts with magnets located around the periphery of the windings, generating electromotive rotational force.

Typically, windings are also attached to a commutator hook as well as to another commutator bar on the opposite side of the commutator that conducts current from the windings to the second brush. This second brush contacts the other commutator bar at the same time the first brush contacts the first bar.

It should be apparent to one of ordinary skill in the art that a generator has a similar current path as the motor described hereinabove. However, in a generator, the armature is rotated by an external means, and the interaction of the windings and magnets generates electric current that is conducted through the commutator to a load attached to the brushes.

Figure 2:
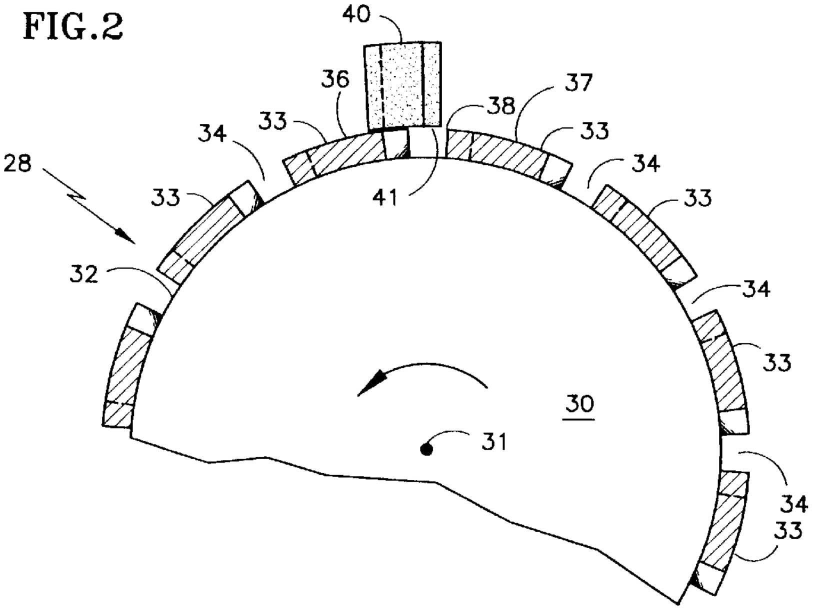
FIG. 2 illustrates a partial axial cross section of a commutator system of the present invention.

Referring to FIG. 2, a partial axial cross section of a commutator system 28 of the present invention is depicted. Commutator system 28 comprises a commutator 30 which rotates around an axis 31. Commutator 30 comprises a body 32 and commutator bars 33 mounted upon the circumference of body 32. Commutator bars 33 are separated from each other by gaps 34. A brush 40 contacts the surfaces 36, 37 of commutator bars 33 as the commutator 30 rotates, thereby conducting current between brush 40 and commutator bars 33. As commutator 30 rotates, an edge 38 of commutator bar 33 makes contact with an edge 41 of brush 40. Commutator bar edge 38 is oriented at an angle to the rotational axis 31, as is the brush edge 41.

The contact of the brush with the commutator, especially with respect to the edge of the brush and the edge of the commutator bar, produces noise as detailed hereinabove. A primary cause of this noise is the impact velocity of the commutator normal to the impact edge of the brush. Brush noise can be significantly reduced by reducing the impact velocity normal to the brush edge. The present invention accomplishes this by orienting the brush such that the impact edge is at an angle to the commutator's rotation axis. This results in the commutator impacting the brush at an angle rather than orthogonally.

Figure 3:
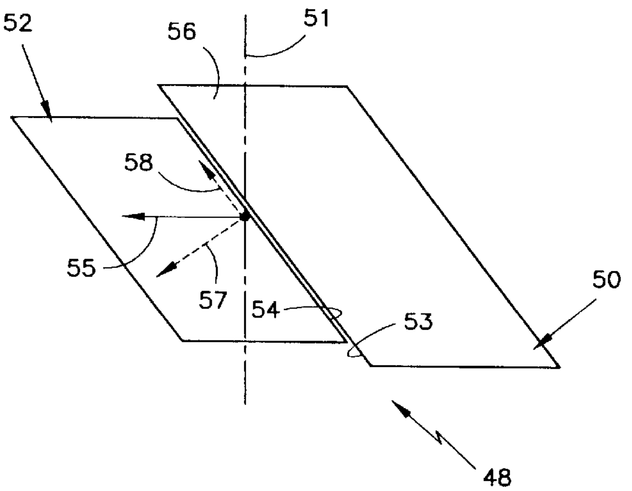
FIG. 3 illustrates the impact of a brush with a commutator bar as represented by the relative velocity vectors of the impact.

Referring to FIG. 3, the relative velocity vectors of the impact of a commutator system 48 is shown. Here, system 48 comprises a commutator bar 50 which rotates about an axis 51 and impacts brush 52. The commutator bar edge 53 impacts a brush edge 54 with an impact velocity vector 55. The impact velocity vector 55 at the commutator bar 50 surface 56 may be expressed by the following formula:

$$V_{comm}=\tilde{O}*D*W,$$

wherein Õ is approximately equal to 3.14159, and D represents the diameter of the commutator, and W represents the rotational velocity of the commutator in revolutions per units time. The impact velocity vector 55 has a component 57 normal to the brush edge 54 and a component 58 that is tangential to the brush edge 54 because the brush edge 54 is oriented at an angle to the rotational axis 51 and thus to the impact velocity vector 55. The normal component 57 of the impact velocity on the brush edge is governed by the equation:

$$V_{norm}=\tilde{O}*D*W*\cos(\mu)$$

wherein Õ is approximately equal to 3.14159, and D represents the diameter of the commutator, W represents the rotational velocity of the commutator in revolutions per units time, and $\mu$ is the angle formed between rotational axis 51 and brush edge 54.

Correspondingly, edge 53 of commutator bar 50 is also oriented at an angle to the rotation axis 51, preferably at the same angle as the brush edge 54. In so doing, commutator bar edge 53 and brush edge 54 are parallel, thereby ensuring that the contact area between commutator bar 50 and brush 52 is not reduced due to the orientation of the brush, which would otherwise decrease electrical performance characteristics. Moreover, this configuration reduces the risk of creating a short circuit across multiple commutator bars, as opposed to a non-parallel arrangement where the brush may contact or arc across three or more bars at certain points.

It should be apparent to one of ordinary skill in the art that the present invention may be manufactured in a similar manner to other commutator systems known in the art. Typically, a commutator body is molded from a non-conducting material. Thermoplastics are commonly used because of their insulative properties, formability, light weight and resistance to heat. Although the shape selected for the commutator is typically based upon the application employed, in one prevalent arrangement, the commutator body comprises a circular shape with a hollow interior to form a tubular structure. As is the convention in the art, a commutator ultimately is mounted on the shaft of the motor or generator. In one embodiment, a ring of electrically conductive material is then attached to or impregnated into the external circumference of at least part of the commutator, forming a circular annulus. The ring comprises copper, aluminum, gold or silver, though it should be apparent to one of ordinary skill in the art that any conductive material may be used. The ring may also be machined to a desired circularity and uniformity of radius and thickness chosen to improve the electrical and noise performance characteristics as well as minimize wear.

Subsequently, commutator gaps are machined into the surface of the conducting ring at predetermined locations. These gaps may be machined by any conventional means, such as, for example, a CNC mill. The conducting material is then removed until the non-conducting body is exposed. This creates insulating gaps between the commutator bars, with the bars having distinct edges adjacent to the gaps. In the present invention, these gaps are machined so that the edges are oriented at an angle to the axis of rotation of the commutator. It should be apparent to one skilled in the art that many configurations exist with respect to the gaps and edges of the present invention. In one embodiment, the edges comprise a linear form and the gaps are spaced uniformly around the circumference of the commutator, having a uniform width and rectangular cross section.

Several other known methods of forming a commutating surface on a commutating body, though the commutating surface of the present invention may be formed from a ring. In a further embodiment of the present invention, for example, individual commutator bars are attached to the body in a predetermined pattern to leave gaps between them. In yet another embodiment, individual commutator bars are mounted into recesses within the body so that the bars are about even with the surface of the body and separated by gaps of non-conductive material.

Similarly, the brush may be made using various means known to those skilled in the art. The brush should have a contact surface made of a conducting material shaped and be biased to contact the commutator particularly during rotation. The impact edges of the brush are designed such that, in operation, the edges are at an angle to the commutator's rotation axis. As noted above, it is preferred that the brush impact edges and the commutator bar impact edges be parallel to maintain optimum performance.

As will be recognized by one of ordinary skill, orienting the brush impact edges at any angle to the rotation axis of greater than zero will reduce the normal impact velocity during rotation of the commutator, and thus reduce noise. Normal impact velocity decreases with increasing angles. It has been observed that significant decreases in impact velocity are realized at angles greater than thirty degrees. Table 1 shows the decrease in velocity for various angles.

TABLE 1

| Angle of Brush to Rotation Axis | Decrease in Normal Impact Velocity (%) |
|---|---|
| 15 | 3.4 |
| 30 | 13.4 |
| 45 | 29.3 |
| 60 | 50.0 |
| 75 | 74.1 |

As the commutator bar edges are formed at greater angles to the rotation axis, they extend over greater arcs of the circumference of the commutator. It has been noted that angles of about sixty degrees provide a substantial reduction in normal impact velocity with also very practical manufacturing capability. However, even further reductions in velocity are achievable at greater angles.

The present invention achieves noise reduction without the increased cost and complexity of additional components. The present invention realizes this goal without requiring closer machining tolerances than are common in the art. The present invention also retains these advantages throughout the life of the commutator system and is not diminished as a function of component usage and wear.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, for example, one skilled in the art may be able to apply the principles of the present invention to arts other than motors or commutators, where noise is caused by the interaction of the surfaces. Moreover, it should be apparent to one of ordinary skill that the edges of the commutator bar and brush may be non-linear in whole or in part, or incorporate various curvatures along their length. It is therefore contemplated that the appended claims will cover any such modifications or embodiments as fall within the true scope of the invention.

What is claimed is:

1. A motor system for reducing noise generated by contacting surfaces having relative motion along an axis, said motor system comprising:

a first brush having a first surface oriented at an angle to the axis of less than ninety (90) degrees;

a plurality of commutator bars for contacting said first surface, each commutator bar of said plurality being oriented substantially parallel to said first surface.

2. The motor system of claim 1, further comprising:

a second brush having a second surface oriented at an angle substantially parallel to said first surface and contacting each commutator bars of said plurality.

3. The motor system of claim 1, wherein said angle is less than about sixty degrees.

4. The motor system of claim 1, wherein the angle is substantially in the range of thirty degrees.

5. A system for reducing noise generated by two surfaces in contact with each other and having relative motion along an axis, the system comprising:

a first surface having a raised portion, the raised portion having edges oriented at an angle to the axis of less then ninety degrees; and a second surface for contacting with said raised portion of said first surface, said second surface having edges oriented substantially parallel to said edges of said raised portion of said first surface.

6. The system of claim 5, further comprising:

a third surface oriented for contacting said raised portion of said first surface, said third surface having edges oriented substantially parallel to said edges of said raised portion of said first surface.

7. The system of claim 5, wherein said first surface forms a commutator, and said second surface forms a first brush.

8. The system of claim 5, wherein said first surface forms a commutator, and said third surface forms a second brush.

9. The system of claim 5, wherein said angle is less than about sixty degrees.

10. The system of claim 5, wherein said angle is substantially in the range of thirty degrees.

11. A commutator system comprising:

a plurality of electrically conducting surfaces electrically separated from each other by substantially non-conducting segments, each of said surfaces and said non-conducting segments forming a generally circumferential surface centered about a rotational axis, said conducting surfaces having edges adjacent to said nonconducting segments and oriented at a positive angle to said rotational axis; and an electrically conducting brush for contacting said circumferential surface, said brush having edges oriented at said angle to said rotational axis.

12. The commutator system of claim 11, further comprising:

a second electrically conducting brush for contacting said circumferential surface, said second brush having edges oriented at said angle to said rotational axis.

13. The commutator system of claim 11, wherein said angle is at least about thirty degrees.

14. The commutator system of claim 11, wherein said angle is about sixty degrees.

* * * * *